US006343715B1

(12) United States Patent
Wolfrom

(10) Patent No.: US 6,343,715 B1
(45) Date of Patent: Feb. 5, 2002

(54) FILLING APPARATUS FOR AXIAL POWDER PRESSES

(75) Inventor: Walter Wolfrom, Assenhausen (DE)

(73) Assignee: Dorst Maschinen-und Anlagenbau GmbH & Co, Kochel Am See (DE)

(*) Notice: Subject to any disclaimer, the term of this patent is extended or adjusted under 35 U.S.C. 154(b) by 0 days.

(21) Appl. No.: 09/436,835

(22) Filed: Nov. 9, 1999

(30) Foreign Application Priority Data

Nov. 9, 1998 (DE) ........................................ 198 51 527

(51) Int. Cl.[7] ................................................ G01F 11/10

(52) U.S. Cl. ........................ 222/162; 222/535; 141/284

(58) Field of Search ............................ 419/38; 222/162, 222/535; 141/284

(56) References Cited

U.S. PATENT DOCUMENTS 4,201,530 A * 5/1980 Vogt ........................... 425/260
5,672,363 A * 9/1997 Sagawa et al. ................ 425/3
6,004,120 A * 12/1999 Matsubara et al. ........... 425/78
6,039,221 A * 3/2000 Chatterjee et al. .......... 222/361

FOREIGN PATENT DOCUMENTS

DE 39 16 951 11/1990

OTHER PUBLICATIONS

Search Report issued by the German Patent Office on Oct. 13, 1999 for German priority application.

* cited by examiner

*Primary Examiner*—Daniel J. Jenkins
(74) *Attorney, Agent, or Firm*—Knobbe, Martens, Olson & Bear LLP

(57) ABSTRACT

A filling apparatus for axial powder presses with a filling device includes a filler drive plate, a filling shoe arranged in particular on the side of the press, and a powder feeding device. The filling device can be moved forward and backward on a filler plate by means of an actuator, and in a filling position the filling shoe can be pressed against the filler plate respectively against a die surface embedded therein. According to the invention, the filling shoe is only loosely coupled to the filler drive plate, thus allowing the filling shoe to be subjected to a controlled and uniform adjusting force.

18 Claims, 4 Drawing Sheets

FILLING APPARATUS FOR AXIAL POWDER PRESSES

FIELD OF THE INVENTION

The invention relates to a filling apparatus for presses and a method for operating such a press. More particularly, the invention relates to a filling apparatus for axial powder presses.

BACKGROUND OF THE INVENTION

For filling a powder press with powder, especially ceramic powder and iron powder, a filling device is moved between each pressing operation over an opening in a filler plate, or over an opening in a die plate embedded in the filler plate of a die set, to fill the opening with powder. Prior to compacting the powder, the filling device is withdrawn to a rest position next to the press. For moving the filling device, there are different known actuating mechanisms, such as crank or spindle mechanisms, which are driven, for example, hydraulically or electromechanically, as well as hydraulic cylinders or servomotors.

The filling apparatus comprises a filling shoe firmly mounted on a filler main body of a filler drive and configured to move forward and backward together with it on the filler plate. Into a centrally arranged opening of the filling shoe there is introduced a filling tube which is rigidly connected to the filling shoe and to the filler drive. At the end of the filling tube projecting out from the filling shoe there is fixed a hose through which powder is fed from a hopper. The hopper is normally arranged above the filling apparatus and laterally at the press.

For filling the die with powder, the filling shoe must be moved over the opening in the die plate and be pressed firmly against it in order to be able to ensure safe, uniform and adequate filling of the die. The contact pressure must be sufficiently high to prevent powder from entering between the filling shoe and the filler plate. The required pressure must be particularly high, if, during displacement of the filling apparatus, the hose, which is normally partly filled with heavy powder, and the hopper are swiveled together with the filling apparatus and exert in particular on the filling shoe a force acting in opposite direction to the displacement and tilting the filling shoe.

For pressing the filling shoe against the filler plate, two methods are commonly used. According to the first method, the filler drive, together with the filling shoe is pressed at an angle from above onto the filler plate or die plate, whereby the total own weight of the filling apparatus rests on the filling shoe and at the same time has a negative effect on guidance in that it acts tilting like a lever. In another method the whole filler drive with the filling shoe is mounted for a swiveling movement around a mounting axis arranged outside the whole apparatus.

It is a disadvantage that onto the filler plate and onto the die and through the latter onto the die set of the press there acts a non-centric pressure at an angle from above or a tensile force at an angle from below which can lead to malfunction, wear and faulty pressing. In addition the apparatuses are of complex structure, difficult to adjust, and have to be replaced more or less completely at regular intervals because the filling shoe is often made of plastic and wears quickly as it is pulled over the filler plate, especially if, due to tilting, remnants of powder enter between the filling shoe and the filler plate.

SUMMARY OF THE INVENTION

An object of the invention is to propose a filling apparatus, especially for axial powder presses, which has a simple structure and allows uniform contact pressure of the filling shoe onto the filler plate and/or die plate.

This object is solved by a filling apparatus having a filling device comprising a filler main body, a filling shoe arranged on the side of the press, and a powder feeding device. The filling device can be moved forward and backward on or above a filler plate and the filling shoe can be pressed in at least one filling position against the filler plate or a die embedded therein. The filling shoe is coupled to the filler main body of the filling device.

As a result of uncoupling, i.e., the separable adjustable coupling of the filling shoe to the filler drive plate, the filling shoe can be pressed against the filler plate with a uniform distribution of pressure. In addition, a pressure force may be adjustable and may be dosed accurately, wherein the weight of the whole filling apparatus no longer rests on the filler plate. This structure is also designed to avoid that the filling shoe rests on the filler plate in a tilted position. Furthermore, it is possible to replace the filling shoe individually and without much expenditure for installation work.

Advantageous configurations are the subject matter of dependent claims.

Coupling of the filling shoe to the filler drive plate via a frame permits the filling shoe to be pressed against the filler plate with good possibility of control. Forces acting, for example, from the filling hose onto the filling apparatus as the latter is being pushed, will no longer be transferred onto the filling shoe.

Coupling the filling shoe via filling shoe mounting bolts being encompassed by recesses in the bottom of the frame, permits the filling shoe to be pushed in a simple and safe manner across the upper surface of the filler plate even in case of interrupted contact pressure.

While the filling shoe is pushed via the frame, a contact pressure adjustable to a lower value may act on the filling shoe ensuring that the filling shoe is pressed firmly enough against the filler plate to prevent remnants of powder from entering between the filling shoe and the filler plate.

Furthermore, the filling shoe, being a wearing part made of plastic in the majority of cases and, therefore, having to be replaced several times when producing large quantities of green parts or compact discs, can be removed and replaced quickly by simply lifting the frame from the filling apparatus.

Another aspect of the invention involves a filling apparatus having a filling device comprising a filler main body and a powder feeding device. The powder feeding device is adjustably and positionably coupled to the filler main body.

Due to the fact that the powder feeding device is mounted to the filler drive plate and not to the filling shoe, the load and the restoring forces of the filling hose, which in addition is filled with heavy powder or remaining quantities of powder, and of the powder feeding hopper, which can be swiveled over a certain angle, are no longer transmitted directly onto the filling shoe but onto the filler drive plate. There is no tilting of the filling shoe, thus avoiding among other things also loss of powder.

Fixing the powder feeding device to the filler drive plate by adjustable carriers permits variable adjustment of the outlet opening of the filling tubes above the die. With this structure, the density of the filled powder, in particular iron or ceramic powder, can be adjusted in a simple way not only in the die as a whole but also in individual portions of it. In this way, dies for producing eccentric sintered parts, e.g., for connecting rods, can be filled with powder more individually.

In particular, a complete plant can be quickly adapted to different compact discs. On the one hand a suitable filling shoe can be inserted into the filling apparatus without much work involved, on the other hand support of the filling tubes on the adjustable carriers permits simple and quick adjustment and fine adjustment of the outlet openings of the filling tubes.

Filling tubes with different—even non-circular—cross sections, make it possible to feed powder or quantities of powder individually to certain areas of the die. By using adjustable flaps in the tubes, this filling effect can be adapted to specific requirements. This, together with the use of more than one filling tube arranged next to each other, permits optimized filling of the die. Therefore, filling pressure and density in particular are individually adjustable.

Generally speaking, adjustment of the individual assemblies is easier because the individual adjusting elements are arranged for easy access in front of the press in the area of the filler drive plate.

BRIEF DESCRIPTION OF THE DRAWINGS

An embodiment is described in more detail below with reference to the drawing. There is shown in.

DETAILED DESCRIPTION OF THE INVENTION

Figure 1:
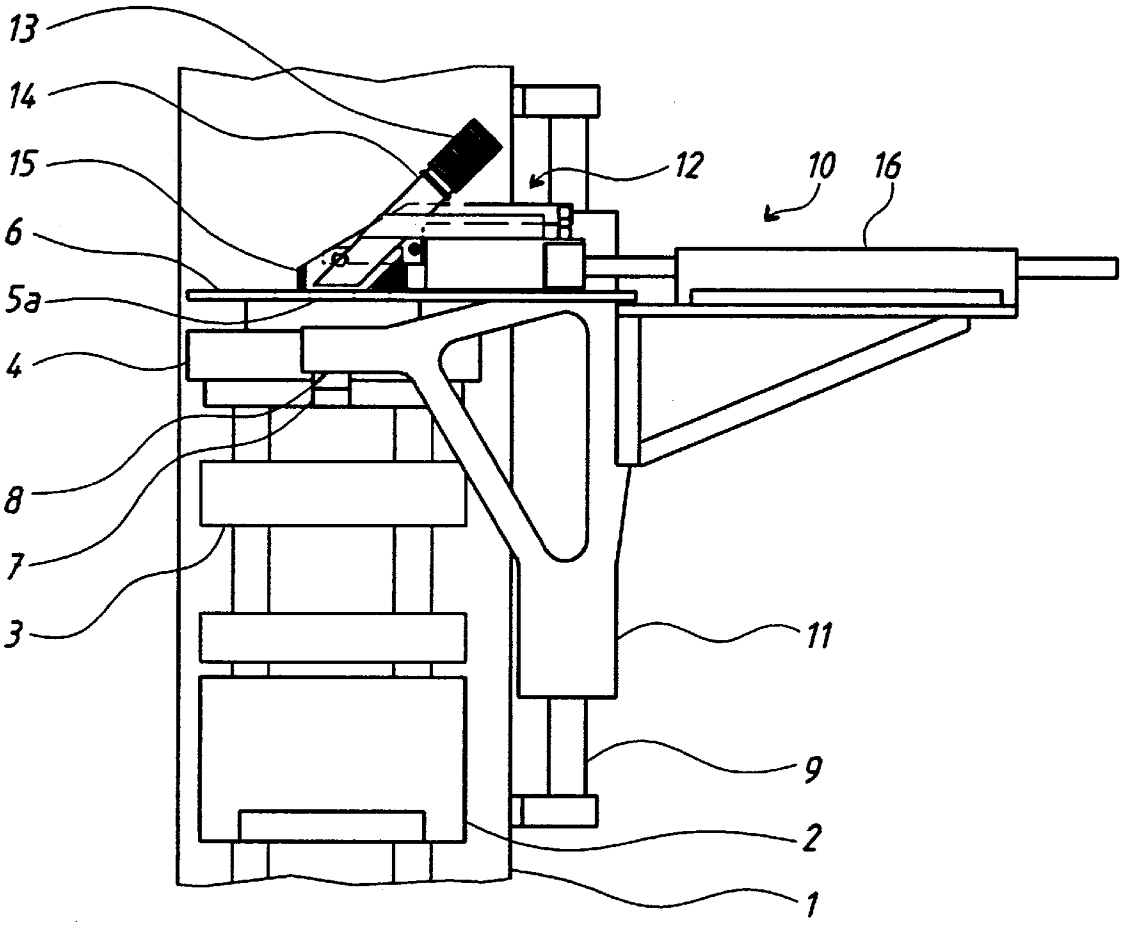
FIG. 1 a side view of a filling apparatus on a powder press.
Figure 2:
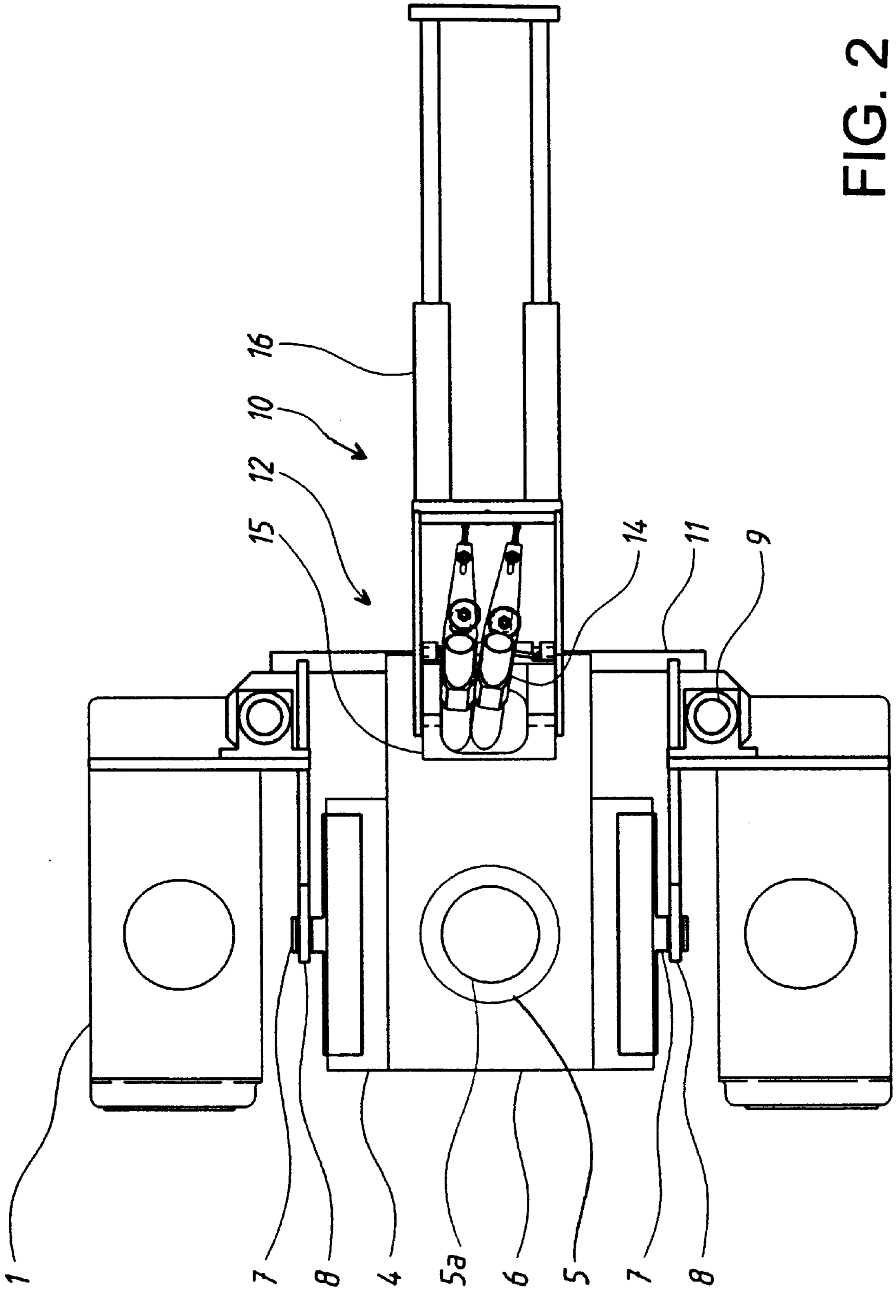
FIG. 2 a plan view of the filling apparatus of FIG. 1 with the filling hose removed, and FIGS. 3 and 4 cutouts of FIGS. 1 and 2 as enlarged partial sectional views.

As can be seen from FIGS. 1 and 2, a powder press comprises a press frame 1 with a base plate 2 mounted to it. In the press frame 1, above the base plate 2, there is arranged and guided a die set 3 adjustable at least in vertical direction. The die set comprises a die bolster 4, a die plate 5 and a filler plate 6, whereby these three elements 4–6 are firmly connected to each other. The die plate 5 is arranged on the die bolster 4. The filler plate 6 is arranged on or around the die plate 5 which partly protrudes through filler plate 6, whereby their surfaces—around an opening 5*a* in the die plate—form a common and plain sliding surface for a filling shoe 15. On this assembly, there is arranged on the die bolster 4, for example, a driving feature 7. On the driving feature 7 there is arranged a filling apparatus or slide driving feature 8 of a slide 11 of a filling apparatus 10 supported directly or supported loosely by a buffer block. For guidance, this slide 11 is mounted on guide rails 9 fixed laterally on the press frame 1 in its vertical respectively longitudinal direction. During pressing, i.e. during the upward or downward movement of the assembly elements 4–6 of the press, the slide 11 is correspondingly moved up or down by means of the driving feature 7 and the slide driving feature 8.

On the slide 11, in particular on its upper surface, there is arranged the filling apparatus proper 10 comprising a filling device 12 on which hoses 13 are mounted on filling tubes 14. In the structure as shown, a powder to be pressed is fed through two hoses 13 and filling tubes 14 each into the filling shoe 15 of the filling device 12.

The filling device 12, in particular its filling shoe 15, is mounted on and can be pushed across the filler plate 6 and the die plate 5. By means of a familiar type actuator 16, there can be moved among other things the filling shoe 15 in synchronism with the pressing cycle of the press over an opening 5*a* in the die plate 5 into the press in order to fill the die with powder, and the filling shoe 15 can be moved laterally out of the area of the press frame in order to be able to compact the powder filled into the die. This process can be effected by automation, in particular by computer control.

Figure 3:
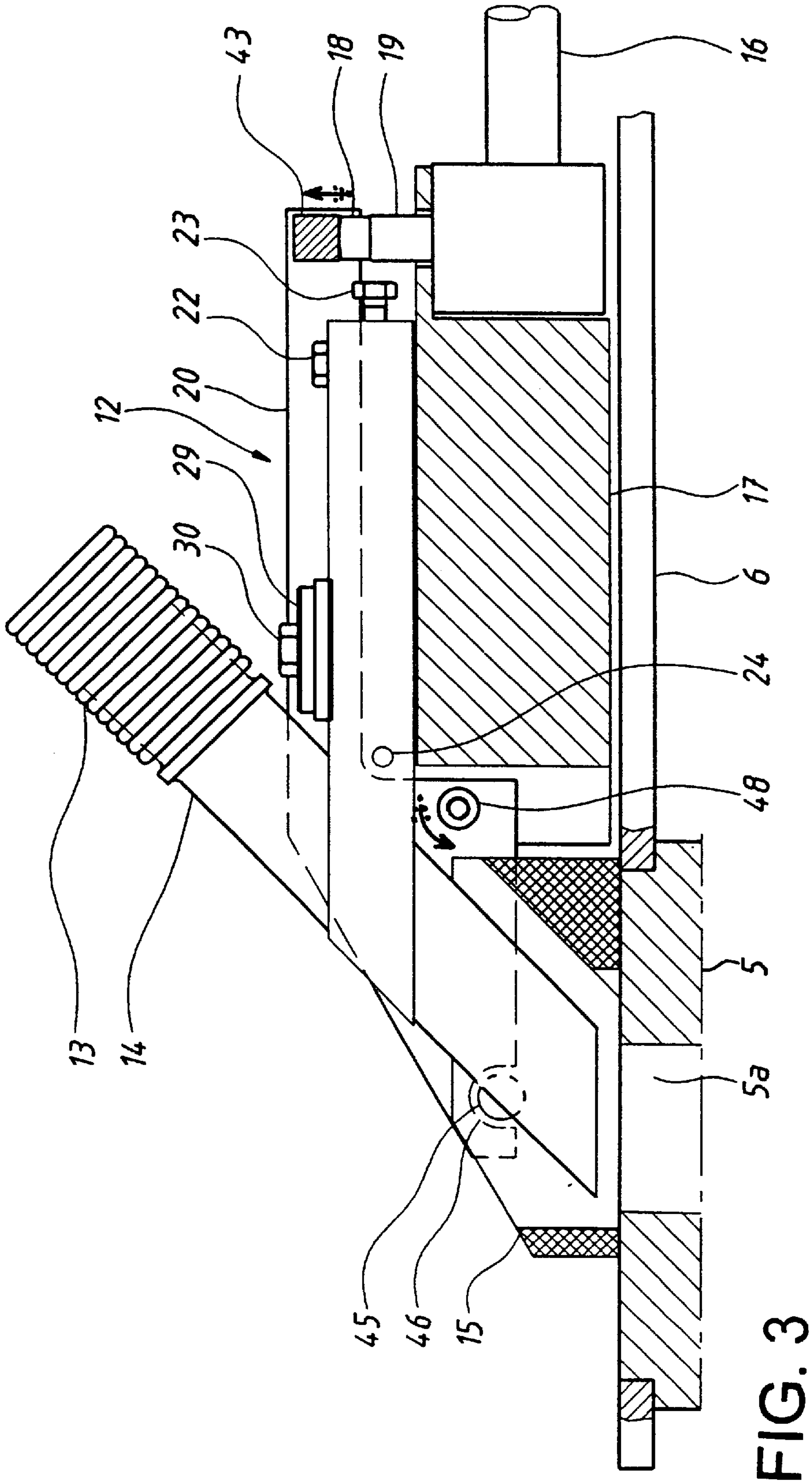
Figure 4:
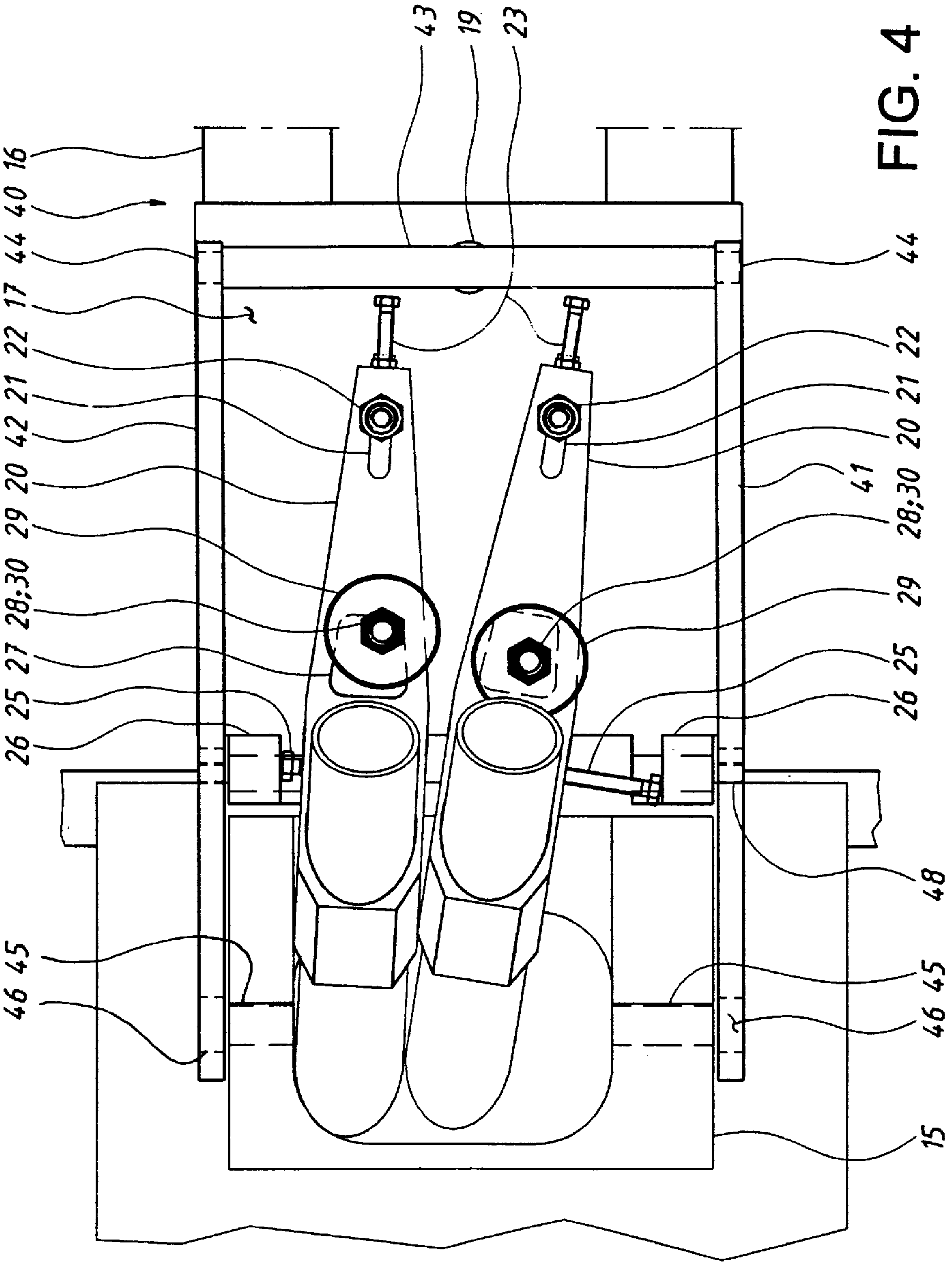

As can be seen from FIG. 3 and 4, the filling device 12 comprises a filler main body respectively a filler drive plate 17, fixed to the press-side end of a piston rod of the actuator 16. The filler drive plate 17 is moved backward and forward preferably directly above the filler plate 6, so that there is no friction between these two plates.

On the upper surface of the filler drive plate 17 there are supported one or several oblong carriers 20, in the embodiment shown these are two carriers 20, designed for holding and positioning one filling tube 14 each. On the end of the carriers 20 on the actuator side there is provided an oblong hole 21 in longitudinal direction of the said carriers, with a carrier journal 22 passing through it and projecting upwards out from the upper surface of the filler drive plate 17.

A setscrew 23 enters at the face side of each carrier 20 and into its oblong hole 21. By means of the setscrew 23 the carrier journal 22 can be adjusted and positioned in the oblong hole 21 in its longitudinal direction in order to be able to adjust the carrier 20 in its longitudinal direction and parallel to the surface of the filler drive plate 17.

Through each carrier 20 there passes—transversely to its longitudinal direction and parallel to the surface of the filler drive plate 17—a threaded hole 24, into which another setscrew 25 is screwed. The shank of this setscrew 25 leads to a stop 26 and abuts against it, whereby the stop 26 is situated on the upper surface of the filler drive plate 17.

Alternatively, there may also protrude, e.g., a bolt 25 laterally from the carriers 20, said bolt being supported on a stop 26, which is mounted for rotation around its longitudinal axis on the upper surface of the filler drive plate 17 near to the end on the side of the press. In this way the carriers 20 can also be adjusted and positioned laterally on the surface of the filler drive plate 17, whereby the carrier journals 22 constitute the center of rotation of the carriers 20.

For repeated adjustment of the positions, e.g., after having replaced a worn component, individual distances can be measured and be compared with values of a table. There may also be scale graduations attached to or worked into the surfaces of individual components.

For pressing the carriers 20 against the surface of the filler drive plate 17, there is formed an opening or through hole 27 at a distance from the oblong hole in each carrier 20. A threaded bolt 28 protruding upwards from the upper surface of the filler drive plate 17 passes through the through hole 27. The through hole 27 is dimensioned in such a way that the filling tube 14 situated on the carrier 20 can be brought into any position required above the die plate opening 5*a*. The threaded bolt 28 passes further through a spring washer 29 and a tensioning nut 30. The spring washer 29 is large enough in diameter to ensure that in any position of the carrier it rests on the rim of the through hole 27 on the upper surface of the carrier 20. By means of the tensioning nut 30 and the spring washer 29 the corresponding carrier 20 can be pressed against the surface of the filler drive plate 17, in order to apply the carrier 20 against this surface in a way preventing its rotation.

Alternatively, instead of the threaded bolt 28 protruding from the filler drive plate 17 and instead of the tensioning nut 30, there may also, e.g., pass a clamping screw from above through the spring washer 29 and through the through hole 27 of a carrier 20 into a threaded opening of the filler drive plate 17. Thereby may be arranged a plurality of threaded openings next to each other on the surface of the filler drive plate 17.

At the front end of each of the carriers 20 facing the press there is fixed at least one filling tube 14. In the embodiment shown, one filling tube 14 each passes through the front end of the carriers 20 facing the press and can be clamped firmly therein. In order to increase throughput, the filling tubes are inclined in a way that on the one hand the angle of inclination is flat enough to permit quick entry of the filling apparatus into the press and quick withdrawal of the filling apparatus 10 out of the press, and that on the other hand the angle of inclination is steep enough to permit uniform and unhindered flow of the powder to be pressed.

On the upper end of each filling tube 14 there is fixed one hose 13 each for feeding powder from a hopper or from a dosing device. The lower end of the filling tubes 14 is shaped at an angle to their longitudinal axis in a way that the filling tube rims are arranged essentially parallel to the plane of the die plate 5 and of the filler plate 6 respectively of the die plate opening 5*a* and closely above it.

On the end portion of the filler drive plate 17 facing the press, a frame 40 is supported for holding and guiding the filling shoe 15. The frame 40 comprises two clamps 41 and 42, preferably arranged laterally to the filler drive plate 17 and in its longitudinal direction.

The end portions of the two clamps, facing the filler or actuator, are connected to each other by a square clamp or transverse clamp 43, with journals 44 on the face of this transverse clamp 43 being mounted in holes of the clamps 41 or 42. The transverse clamp 43 is arranged above and spaced at a certain distance to the end portion of the filler drive plate 17, this end portion facing the actuator. The transverse clamp 43 is supported on at least one pressure piece of a piston rod 18 of a short-stroke cylinder 19. The short-stroke cylinder 19 is fixed on or in the filler drive plate 17 and serves for pressing the transverse clamp 43 of the frame 40 upwards.

On the end portion on the side of the press, there are mounted in the clamps 41 and 42 filling shoe mounting bolts 45 protruding laterally from the filling shoe 15. Mounting of the filling shoe mounting bolts 45 is preferably carried out by a semicircular recess 46 each in the lower surface of the clamps 41 respectively 42, i.e. in that the recesses 46 in the clamps 41 and 42 rest on the filling shoe mounting bolts 45. Thus the filling shoe can be removed and replaced very simply and quickly after simply lifting the clamps 41 and 42 respectively the filling device 10 with these clamps.

Depending on the desired contact pressure or leverage onto the filling shoe mounting bolts 45, the clamps 41 and 42 are mounted on the side of the filler drive plate 17 in its central portion or its portion on the side of the press. One clamp mounting bolt 48 each protruding laterally from the filler drive plate 17 serves for mounting the clamps 41 and 42 in a way enabling their swiveling movement. In order to permit arrangement of the filling tubes 14 at a specially small angle of inclination, a portion of the front edge of the filler drive plate 17 is arranged in a position set back to the rear.

As the transverse clamp 43 is pressed upwards, the clamps 41 and 42 are swiveled around the clamp mounting bolts 48. Consequently the ends of the clamps 41 and 42 on the side of the press are swiveled downwards and subject the filling shoe mounting bolts 45 to pressure corresponding to the intensity of pressure of the short-stroke cylinder 19 and of the acting lever of the clamps 41 respectively 42. After installation of the filling apparatus 10 into the press, the short-stroke cylinder 19 can be activated partly or preferably continuously during operation.

In the embodiment shown, the front portion respectively the portion facing the press of the clamps 41 and 42 is larger towards the bottom than their portion facing the actuator. Alternatively there is, however, also possible a different way of mounting the frame 40 on the filler drive plate 17, e.g., guidance of flat clamps in a groove-type recess in their surface.

An example of a pressing cycle comprises the steps of forward respectively inward movement of the filling apparatus 10 across the filler plate 6 into the press, so that the filling shoe 15 is placed above the die plate opening 5*a*, firmly pressing the filling shoe 15 onto the die plate 5 by activation of the short-stroke cylinder 19, filling of the die 5 of the press with powder, optionally partial or complete deactivation of the short-stroke cylinder 19, withdrawal of the filling apparatus 10 together with the filling shoe 15 out of the press, compaction of the powder in the die to form a green compact by activation of the corresponding pressing punches, and finally, after compaction, deactivation and withdrawal of the pressing punches. Due to the fact that the filling apparatus 10 is mounted on the slide 11, during pressing, the whole filling apparatus 10 together with the die set 3, i.e. the filler plate 6, the die plate 5 and the die bolster 4 is moved, so that there can take place partial overlapping of the above mentioned process steps. Open loop or closed loop control of the individual process steps is effected preferably by a computer which evaluates also measured values of pressure transducers, displacement transducers and acceleration transducers on the plant.

In one embodiment, the filling tubes have an elliptic instead of a circular cross section. In this embodiment it is also possible to install an adjustable flap in the filling tubes in order to be able to carry out fine adjustment of the cross section of the tube. In a specially preferred embodiment, adjustment of the flaps is possible by means of an external control adjustable by means of a central computer controlling the whole plant.

Furthermore, adjustability of the filling positions can be further improved by means of more than one filling tube with different diameters or different cross sections, in particular if non-centric green parts or compacts have to be produced and the die has to be filled with powder more densely or less densely in certain areas.

What is claimed is:

1. A filling apparatus having a filling device configured to be moved forward and backward on or above a filler plate of a press, said filling device comprising:

a filler main body;

a filling shoe loosely coupled to said filler main body of said filling device, wherein the filling shoe can be pressed in at least one filling position against said filler plate or a die embedded therein, and wherein the loose coupling of the filling shoe allows the filling shoe to be decoupled from the filler main body by lifting up the filler main body or at least a part of the filler main body from the filling shoe; and a powder feeding device configured to supply filling material to the filling shoe, said powder feeding device being coupled to said filler main body such that said powder feeding device is decoupled from said filling shoe by decoupling said filling shoe.

2. The filling apparatus according to claim 1, wherein said filling apparatus feeds powder into an axial powder press.

3. The filling apparatus according to claim 1, wherein said filling shoe is coupled to said filler main body by at least one clamp or frame, wherein an adjusting force can be exerted in a filling position by said at least one clamp or frame, pressing the clamp or a frame portion arranged next to said filling shoe towards said filling shoe.

4. The filling apparatus according to claim 3, wherein said frame is mounted for carrying out a swiveling movement around a mounting bolt and wherein the frame portion next to said filling shoe can be swiveled towards said filling shoe or away from it.

5. The filling apparatus according to claim 4, wherein a portion of said frame, which is opposite to said portion next to said filling shoe is subject to said adjusting force, which presses said portion of said frame on said side of said filling shoe towards said filling shoe.

6. The filling apparatus according to claim 3, wherein at least one recess in a lower surface of said frame partly encompasses at least one filling shoe mounting bolt of said filling shoe for exerting said adjusting force and for pushing across said filler plate.

7. The filling apparatus according to claim 5, wherein at least one recess in a lower surface of said frame partly encompasses at least one filling shoe mounting bolt of said filling shoe for exerting said adjusting force and for pushing across said filler plate.

8. A filling apparatus having a filling device configured to be moved forward and backward on or above a filler plate of a press, said filling device comprising:

a filler main body;

a filling shoe, wherein said filling shoe is loosely coupled to said filler main body of said filling device, wherein the filling shoe can be pressed in at least one filling position against said filler plate or a die embedded therein; and a powder feeding device configured to supply powder to the filling shoe, said powder feeding device being coupled to said filler main body so that the powder feeding device is decoupled from the filling shoe.

9. The filling apparatus according to claim 8, wherein said powder feeding device is fixed to said filler drive plate by at least one carrier, with said at least one carrier being adjustable and positionable in longitudinal and lateral direction of said carrier on said filler main body.

10. The filling apparatus according to claim 9, wherein said at least one carrier has an oblong hole, in which a carrier journal of said filler main body can be adjusted and positioned in longitudinal direction.

11. The filling apparatus according to claim 9, wherein at least one clamping bolt for locating said at least one carrier on said filler main body passes from said filler main body through a through hole in said at least one carrier and through a spring washer overlapping at least partly said through hole.

12. The filling apparatus according to claim 10, wherein at least one clamping bolt for locating said at least one carrier on said filler main body passes from said filler main body through a through hole in said at least one carrier and through a spring washer overlapping at least partly said through hole.

13. The filling apparatus according to claim 8, wherein said filler main body comprising a filling shoe, said filling shoe being coupled to a portion of said filler main body spaced from coupling portion of said powder feeding device.

14. The filling apparatus according to claim 13, wherein said at least one filling tube of said powder feeding device has a circular or elliptic cross section, an end of said at least one tube extending into an opening of and leading through said filling shoe.

15. The filling apparatus according to claim 13, wherein said at least one filling tube of said powder feeding device comprises an adjustable flap for controlling the powder flow.

16. The filling apparatus according to claim 8, wherein said filler main body comprises a filler drive plate.

17. The filling apparatus according to claim 8, wherein said filling apparatus feeds powder into an axial powder press.

18. A method of operating a press comprising the steps of:

loosely coupling a filling shoe to a main body of said press;

coupling a powder feeding device to the main body such that said powder feeding device is decoupled from said filling shoe by decoupling said filling shoe;

moving repeatedly said filling shoe via said main body forward and backward on or above a filler plate, said method comprising per cycle:

pressing said filling shoe at least in a filling position against said filler plate or against a die embedded in said filler plate;

filling said die in said filling position with powder; and retracting said filling shoe from said filling position for compacting said powder within said die.

* * * * *